United States Patent [19]

Hasebe et al.

[11] Patent Number: 5,321,531
[45] Date of Patent: Jun. 14, 1994

[54] IMAGE PROCESSING APPARATUS CAPABLE OF DOCUMENT DISCRIMINATION

[75] Inventors: Takashi Hasebe; Satoshi Haneda, both of Hachioji, Japan

[73] Assignee: Konica Corporation, Tokyo, Japan

[21] Appl. No.: 46,802

[22] Filed: Apr. 16, 1993

[30] Foreign Application Priority Data

May 11, 1992 [JP] Japan .................... 4-117472

[51] Int. Cl.[5] .............................................. H04N 1/46
[52] U.S. Cl. ................................... 358/505; 358/453; 358/462; 358/538; 358/467
[58] Field of Search ............... 358/447, 448, 452, 453, 358/455, 458, 462, 464, 467, 500, 515, 527, 538, 505; 382/54

[56] References Cited

U.S. PATENT DOCUMENTS 5,001,576  3/1991  Tanaka et al. .................. 358/462
5,075,787  12/1991  Shaughnessy et al. ............ 358/448

FOREIGN PATENT DOCUMENTS 0064264  3/1991  Japan .............................. H04N 1/46
0064267  3/1991  Japan .............................. H04N 1/46

Primary Examiner—Edward L. Coles, Sr.
Assistant Examiner—Jerome Grant, II
Attorney, Agent, or Firm—Finnegan, Henderson, Farabow, Garrett & Dunner

[57] ABSTRACT

An apparatus identifies the type of a document from color image signals either a color document, a black and white document or a marked document, the marked document having a image processing region designated with a color marker differing in color from possible colors of the document to be read, thereafter applies one of a plurality of processing modes to the color image signals in accordance with the type of the document.

2 Claims, 10 Drawing Sheets

IMAGE PROCESSING APPARATUS CAPABLE OF DOCUMENT DISCRIMINATION

BACKGROUND OF THE INVENTION

The present invention relates to an image processing apparatus, more specifically to an image processing apparatus suitable for image processing in a color copying machine of a digital type, and especially to an image processing apparatus wherein even when a marker document on which an image processing region can be designated by a color marker, an ordinary color document and a black and white document are mixedly processed through the input therefrom, output of each document can be subjected to processing which is optimum for that document.

Up to now, there has been known a color copying machine of the so-called digital type wherein a document is scanned optically to form an optical image which is received by a line image sensor, for example, to be converted into electric signals. The electric signals are further digitized, and an electrostatic latent image is formed on a photoreceptor by a writing device such as a semiconductor laser based on the document image information converted to the aforementioned digital signals.

In a color copying machine, a color is reproduced by superposing a plurality of toner images, each having a color different from others (e.g., yellow Y, magenta M, cyan C and black Bk). In the case of a black and white document, a step of forming a toner image can be completed by forming only a black toner image, thereby it is possible to enhance productivity for copies, compared to that of a colored document.

Therefore, in some color copying machines of a digital type mentioned above, a document is discriminated in advance based on image information converted to the aforementioned digital signals whether the document is a color document or a black and white one. Based on the results of discrimination of the document, a copying process is performed through the mode which is suitable for the discriminated document.

In a copying machine equipped with a function to discriminate a document whether it is a color document or a black and white document as mentioned above, a type of each document to be copied can be discriminated and a processing mode suitable for the document type is selected automatically. Therefore, even when both a color document and a black and white document are set mixedly in an automatic document feeder (hereinafter, referred to as ADF), continuous copying has been possible through the mode suitable for each document.

Further, some color copying machines of the digital type mentioned above are equipped with a function of a partial color conversion process. The partial color conversion process, in this case, means an image editing process wherein image information inside (or outside) the region designated on a black and white document by a color marker can be converted to a color used for designating the region, for example, to be recorded.

When carrying out the partial color conversion process mentioned above, a user has been required to set on a copying machine a document (hereinafter referred to as a marker document) on which a region to be subjected to partial color conversion processing is designated with a color marker, and to select manually the mode for executing the aforementioned partial color conversion processing by operating a switch, for copying process.

Therefore, when marker documents are set on an ADF together with ordinary documents (a color document or a black and white document that is not designated by a color marker) other than a marker document, it has been impossible for these ordinary documents to be processed continuously under their own mode, with the marker documents processed in the same manner as in the ordinary document. However, it has been possible to set only a bundle of marker documents on an ADF for continuous operation of the mode for partial color conversion processing.

SUMMARY OF THE INVENTION

The present invention has been achieved with a background of the problems mentioned above, and its object is to realize that even when color documents, black and white documents and marker documents are set mixedly on an ADF, the document conveyed automatically and read can be subjected to automatic image processing under the mode suitable for that document.

An image processing apparatus in the invention, therefore, is one wherein color image information obtained by reading an image on a document through photoelectric conversion is inputted and the color image information is processed therein to be outputted. The image processing apparatus comprises a document discrimination means for discriminating the document corresponding to the inputted color image information, whether it is a color document, a black and white document or a marker document on which an image processing region is designated with a designating color that is different from a color of the document to be read; and an image output processing means for conducting different output processing corresponding to inputted color image information in accordance with a type of the document discriminated by the aforementioned document discrimination means.

In the foregoing, the document discrimination means can be arranged so that it may output information about a designating color used for designating a region and information about the region as a result of discrimination of a marker document; and the image output processing means can be arranged so that it may convert an image in the image processing region to the aforesaid designating color based on the information mentioned above, for outputting.

It is preferable that the document discrimination means mentioned above comprises a color discrimination means that discriminates a color of each pixel of the inputted color image information; a designated region detection means that detects the region designated with the aforementioned designating color based on the results of color discrimination made by the color discrimination means; and an image discrimination means that discriminates a type of a relevant document image based on the inputted color image information. A document is discriminated, whether it is a color document, a black and white document or a marker document, based on the results of color discrimination, the results of detection of the designated region, and the results of discrimination of the document image.

It is preferable that the image discrimination means mentioned above is constituted so that the document image may be discriminated into two types, one is a photographic image having gradation and the other is a line image such as a character and a line.

It is further preferable that the document discrimination means is constituted so that it may discriminate, based on the results of color discrimination of inputted color image information, between a group of color documents consisting of a color document as well as a marker document and a black and white document, and it may discriminate a document judged to be included in a group of color documents to be a marker document when a designated region exists and a document image in the designated region is a character and line image.

In the image processing apparatus constituted as described above, a document corresponding to the inputted color image information is discriminated whether it is a color document, a black and white document or a marker document, and a step of different output processing is taken depending upon the results of the discrimination. Therefore, even when a color document, a black and white document and a marker document are processed mixedly, output processing suitable for each document can be performed automatically.

In this case, when a document is discriminated to be a marker document, an image in an image processing region can be converted to a designated color to be outputted as a color image based on information of designating color and of a region.

Discrimination of a color document, a black and white document or a marker document can be done by discriminating a color for each pixel, detecting a designated region where a color is converted based on the results of the color discrimination and further by discriminating the type of a document image.

In the discrimination of a document image mentioned above, the document image is discriminated to be a photographic image having gradation or to be a character/line image, and based on the results of color discrimination for each pixel, the document image is discriminated to be either a group of color documents consisting of a color document and a marker document or a black and white document. When it is discriminated to be included in a group of color documents, and it is discriminated to be a marker document when a designated region exists and a document image within the designated region is a character/line image, while when the above-mentioned conditions are not satisfied, the document image is discriminated to be a color document.

DETAILED DESCRIPTION OF THE PREFERRED EMBODIMENT

Examples of the invention will be explained as follows.

Incidentally, the present example to be explained represents an image processing apparatus to be applied to a color copying machine of a digital type.

A color copying machine of a digital type in the present example is composed of a scanner unit, an image processing apparatus of the invention and a printer unit. In the scanner unit, optical images obtained through scanning of images on a document are received by a photoelectric conversion element such as a line sensor for photoelectric conversion so that electric signals corresponding to the images on the document may be obtained. Then, in the image processing apparatus, the electric signals obtained by the photoelectric conversion mentioned above are converted to digital signals, and the digital signals are outputted to the printer unit after being subjected to various processings. In the printer unit, a writing unit such as a laser beam scanner is controlled to form an electrostatic latent image through exposure scanning on a photoreceptor drum, based on the digital image signals outputted from the image processing apparatus. The electrostatic latent image mentioned above is developed and transferred onto a recording sheet.

Incidentally, the color copying machine of a digital type in the present example is equipped with an automatic document feeder (ADF).

Now, the constitution of the image processing unit (image processing apparatus) mentioned above will be explained as follows, referring to circuit block diagrams.

Figure 1:
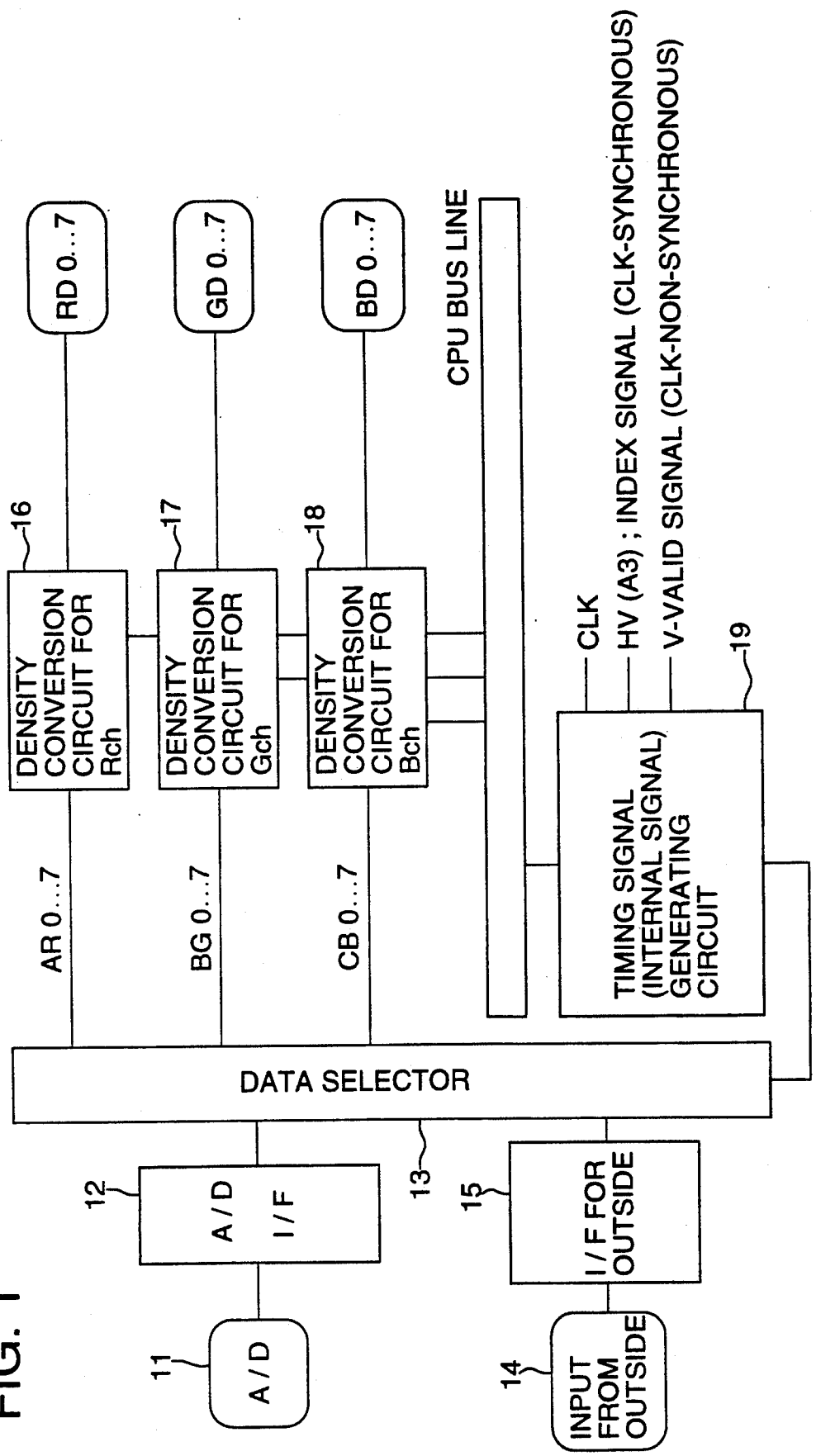
FIG. 1 is a block diagram of circuits showing the input section in the image processing circuits of an example.

FIG. 1 shows an input circuit for color image information in the image processing apparatus.

In FIG. 1, image signals (analog signals) of the three primary colors of red R, green G and blue B outputted from an unillustrated scanner unit are converted to digital signals by means of A/D converter 11.

Color image information on the document read which has been digitized is inputted to data selector 13 through interface 12. Incidentally, the data selector 13 mentioned above can receive also image data from external equipment, such as a film projector through interface 15 for external use.

Digital image signals AR, BG and CB respectively for R, G and B outputted from the aforementioned data selector 13 respectively are converted to density data RD, GD and BD of the three primary colors respectively by means of density conversion circuits 16, 17 and 18.

Incidentally, in FIG. 1, the numeral 19 is a timing signal generating circuit to which synchronous signals H-V and V-V in the primary scanning direction and the secondary scanning direction obtained from a writing unit side of a printer unit as well as clock signals CLK are supplied so that timing signals may be formed in the timing signal generating circuit based on the synchronous signals and CLK signals.

Figure 2:
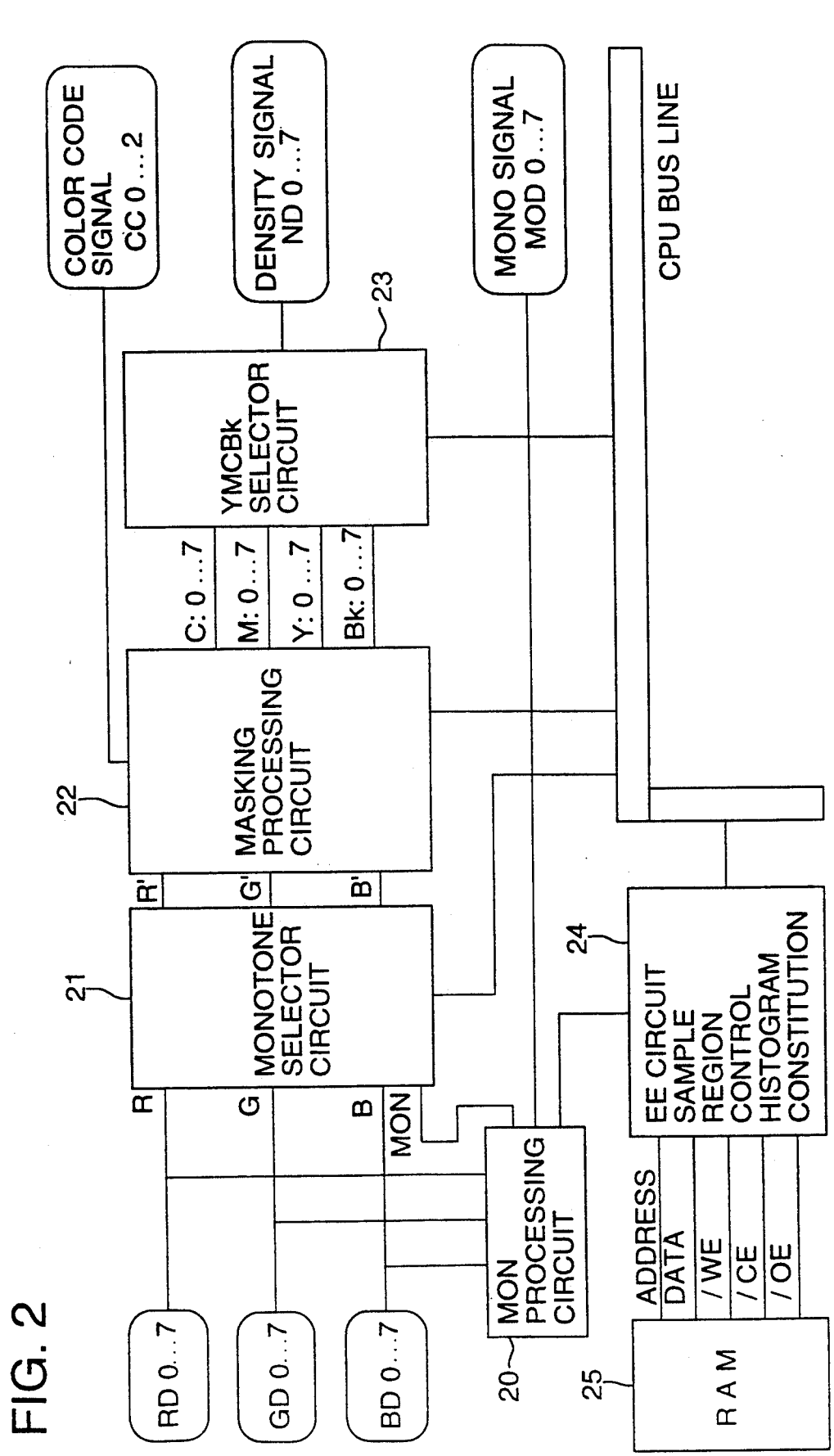
FIG. 2 is a block diagram of circuits showing the color discrimination section in the image processing circuits of an example.

The density data RD, GD and BD mentioned above are further processed by a color discrimination circuit as shown in FIG. 2.

In FIG. 2, the density data RD, GD and BD are inputted into MON processing circuit 20 where density data signals MOD for monotone reproduction are processed. Monotone selector circuit 21, to which the aforementioned density data MOD for the monotone reproduction and density data RD, GD and BD for the three primary colors corresponding to inputted color image data are inputted, switches and outputs the density data of the three primary colors depending on whether the mode is a monotone copy mode in sepia color, for example, or an ordinary color copy mode. Namely, in the present example, there is provided a function to process a document by outputting as a colored monotone image such as that of a sepia color or the like.

In masking circuit 22 into which density data from the aforementioned monotone selector circuit 21 are inputted, each pixel is discriminated in terms of a color based on density information for each color of R, G and B, and color code signals CC showing a color (for example, white, black, yellow, magenta and cyan) to which each pixel belongs are generated. Incidentally, the masking circuit 22 corresponds a color discriminating means.

Further, in the masking circuit 22, density information of each color of R, G and B is converted to density data for each color of yellow Y, magenta M, cyan C and black Bk and to be outputted. The density data for each color of Y, M, C and Bk are selected by selector circuit 23 and the color code signal CC mentioned above for each pixel and density data corresponding to the color code signal CC are outputted.

In FIG. 2, EE circuit 24 is a circuit to control a sampling area for image data based on density histogram information, and RAM 25 is a work memory used for preparing the density histogram mentioned above.

Figure 3:
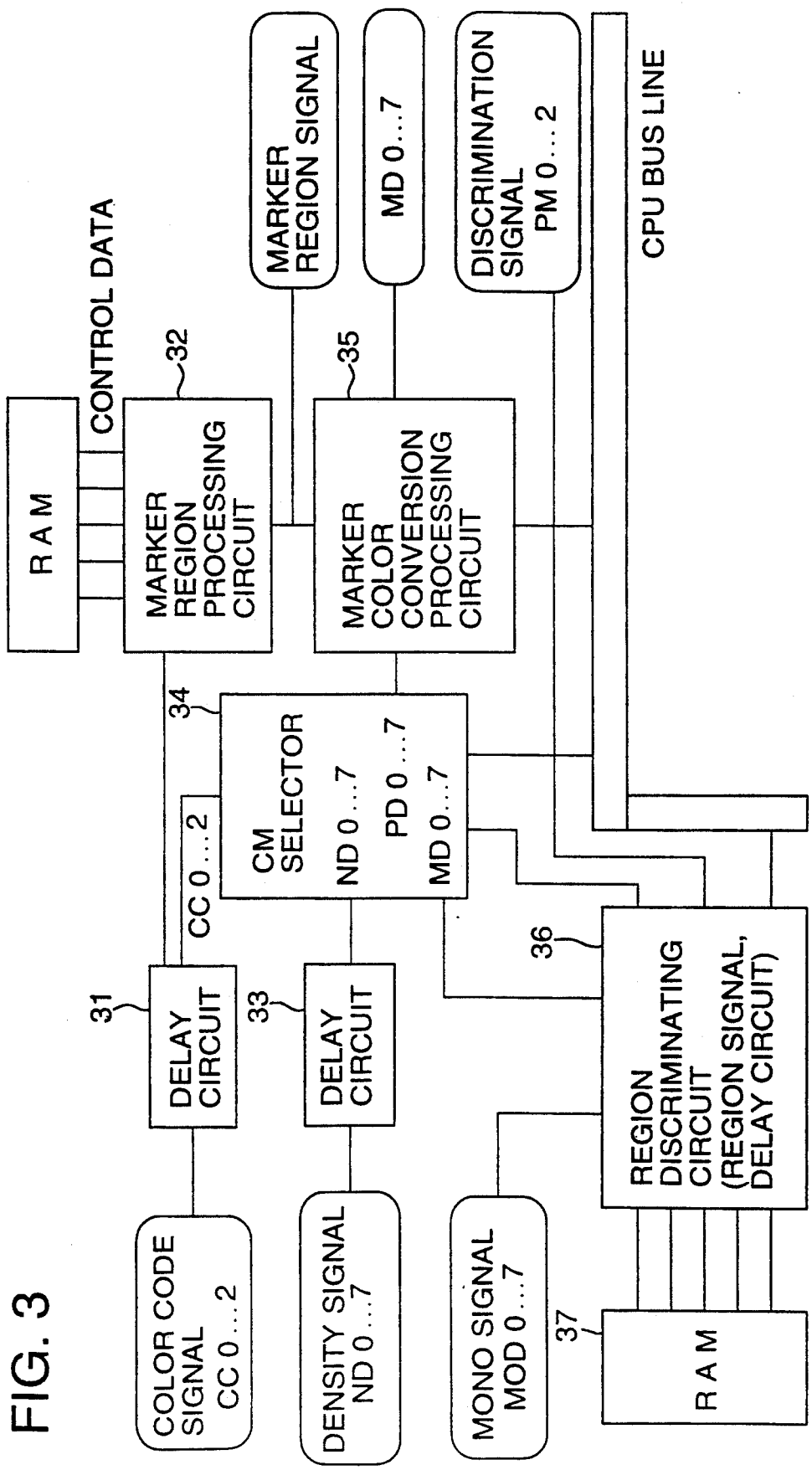
FIG. 3 is a block diagram of circuits showing the color processing section in the image processing circuits of an example.

The above-mentioned color code signal CC, density signal ND showing density data of the color code signal CC, and density signal MOD for monotone reproduction use are processed by a processing circuit shown in FIG. 3.

In FIG. 3, color code signals CC (results of color discrimination for each pixel) are inputted into marker region processing circuit 32 (detecting means for designated regions) through delay circuit 31, and a marker region (designated region of designated color) is detected in the marker region processing circuit 32. The marker region processing circuit 32 detects marker signals from a color marker formed across each scanning line, and outputs marker region signals (signals showing color conversion region) through the detection of the marker signals.

A color copying machine of a digital type in the present example is equipped with an image processing function of partial color conversion processing that can convert image information in a region designated with a color marker on a black and white document to a marker color used for designating the region, and the region for color conversion on a marker document mentioned above is detected by the above-mentioned marker region processing circuit 32.

To color monotone selector 34, density signal ND corresponding to the above mentioned color code signal CC is inputted through delay circuit 33, and further, color code signal CC through delay circuit 31 and monotone density signal MD through region discriminating circuit 36 mentioned later are inputted, and density data for color copying and density data for monochromatic copying are outputted selectively.

Marker color conversion processing circuit 35 converts an image within a marker region to a marker color based on the aforementioned marker region signals when a document to be read is a marker document. To be concrete, density data are normally outputted only in the case of color code signal CC that corresponds to a color for copying. When a marker region is detected, however, density data are outputted in the case of copy sequence of the same color as that used for designating the aforementioned marker region, thereby it is possible to record an area within the marker region with a designated color.

Namely, with regard to a marker document, when a color of a document to be read is black and density data are usually outputted only in the case of black copying (when a black toner image is formed). However, when a region is designated with a color marker, density data for black pixels are outputted in the case of copying in a color corresponding to the aforementioned marker color, thereby it is possible to record an image that is black on a document after converting it to the marker color.

Incidentally, in the present example, an image output processing means is composed of the above mentioned color monotone selector 34 and marker color conversion processing circuit 35.

Monotone density signal MOD is inputted into region discriminating circuit 36 (image discrimination means) where a document image is discriminated whether it is a photographic image having gradation or a character/line image composed of characters and lines, based on the monotone density signal MOD mentioned above. The results of such discrimination are outputted as discrimination signal PM for each pixel. Incidentally, in FIG. 3, the numeral 37 is a RAM as a work memory provided on region discriminating circuit 36.

Figure 4:
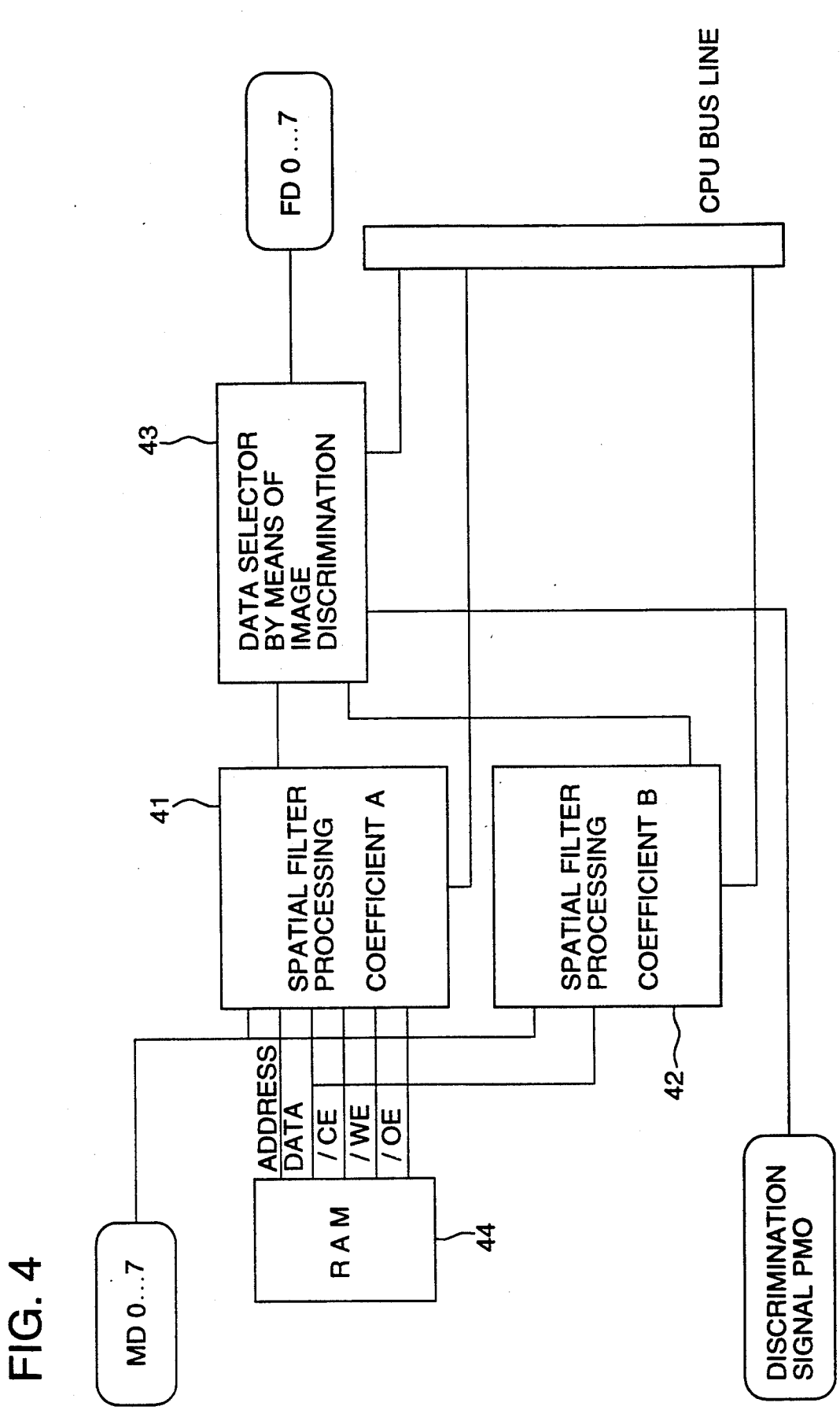
FIG. 4 is a block diagram of circuits showing the spatial filter processing section in the image processing circuits of an example.

Density signal MD outputted through the aforementioned marker color conversion processing circuit 35 are subjected to gradation conversion processing by means of a spatial filter processing circuit shown in FIG. 4.

The spatial filter processing circuit mentioned above is equipped with spatial filter processing circuits 41 and 42 which convert gradation based on different coefficients A and B. Density data generated through gradation-processing conducted by the spatial filter processing circuits 41 and 42 are selected by data selector 43 by means of image discrimination to be singled out in accordance with the above-mentioned discrimination signal PM, and the selected one is outputted.

Namely, a specific character of gradation processing can be switched automatically to, for example, sharp or soft depending on whether a document image is a photographic image or a character/line image.

In FIG. 4, the numeral 44 is an RAM as a work memory for spatial filter processing.

Figure 5:
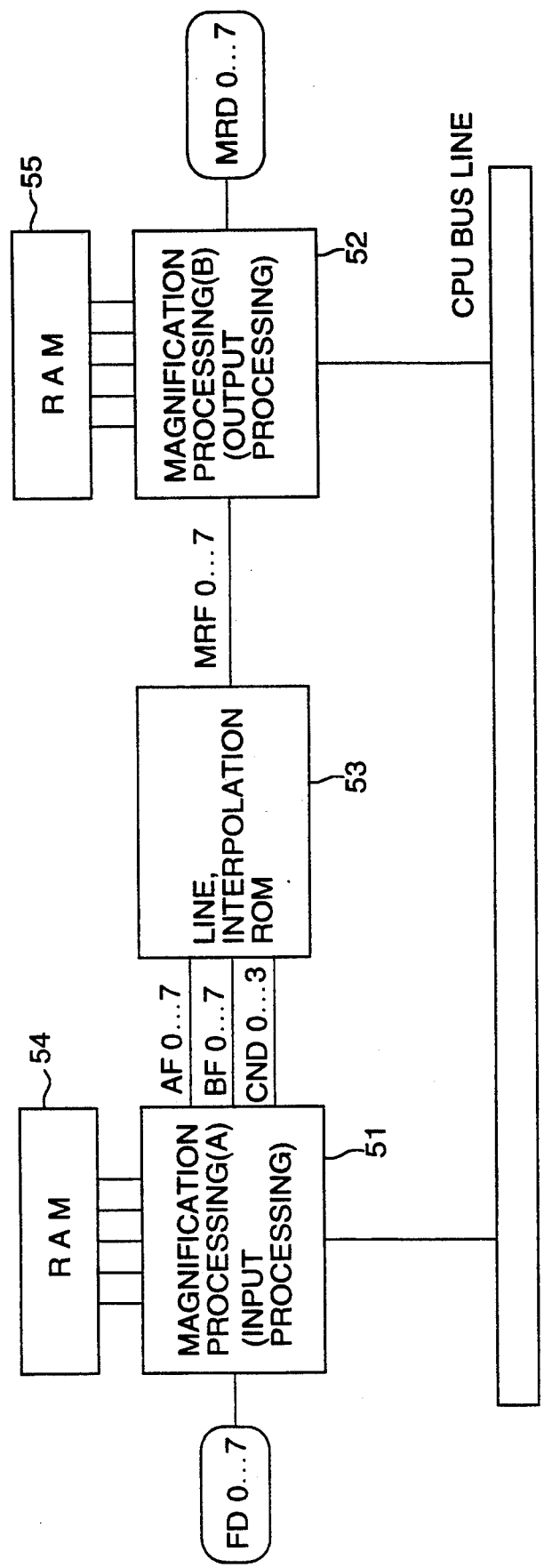
FIG. 5 is a block diagram of circuits showing the magnification processing section in the image processing circuits of an example.

Density data FD subjected to gradation conversion processing in the spatial filter processing circuit shown in FIG. 4 are sent to a magnification processing circuit shown in FIG. 5.

The magnification processing unit is composed of magnification processing circuit (A) 51 on the input side, magnification processing circuit (B) on the output side, linear interpolation table (ROM) 53 and RAMs 54 and 55 both provided on the aforementioned magnification processing circuits (A) and (B). The constitution mentioned above is for image processing for enlargement copying or reduction copying for a document. When enlarging, for example, a space between adjoining density data is interpolated linearly and is outputted as converted data, while when reducing, data are subjected to thinning out and outputted as converted data.

Figure 6:
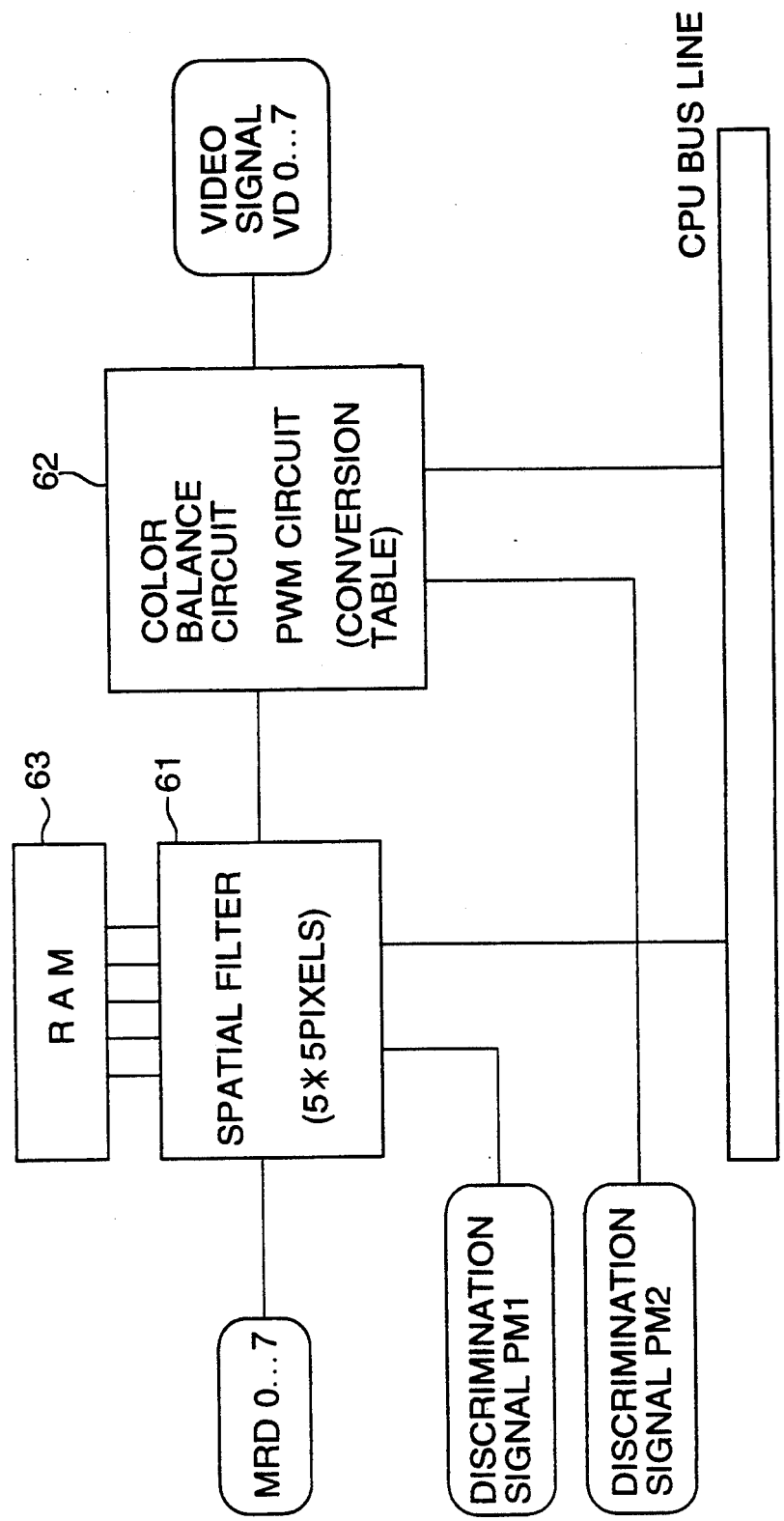
FIG. 6 is a block diagram of circuits showing the correction processing section in the image processing circuits of an example.

Density data MRD processed for enlargement or reduction are further subjected to correction processing made by a correction circuit shown in FIG. 6.

In FIG. 6, density data MRD are first processed by spatial filter 61, then adjusted in terms of color balance by color balance circuit (PWM circuit) 62 and converted to video signal VD. The video signal VD mentioned above is supplied to a printer unit in the case of the present example, and a laser beam modulated in accordance with the video signal VD forms a latent image on a photoreceptor.

Figure 7:
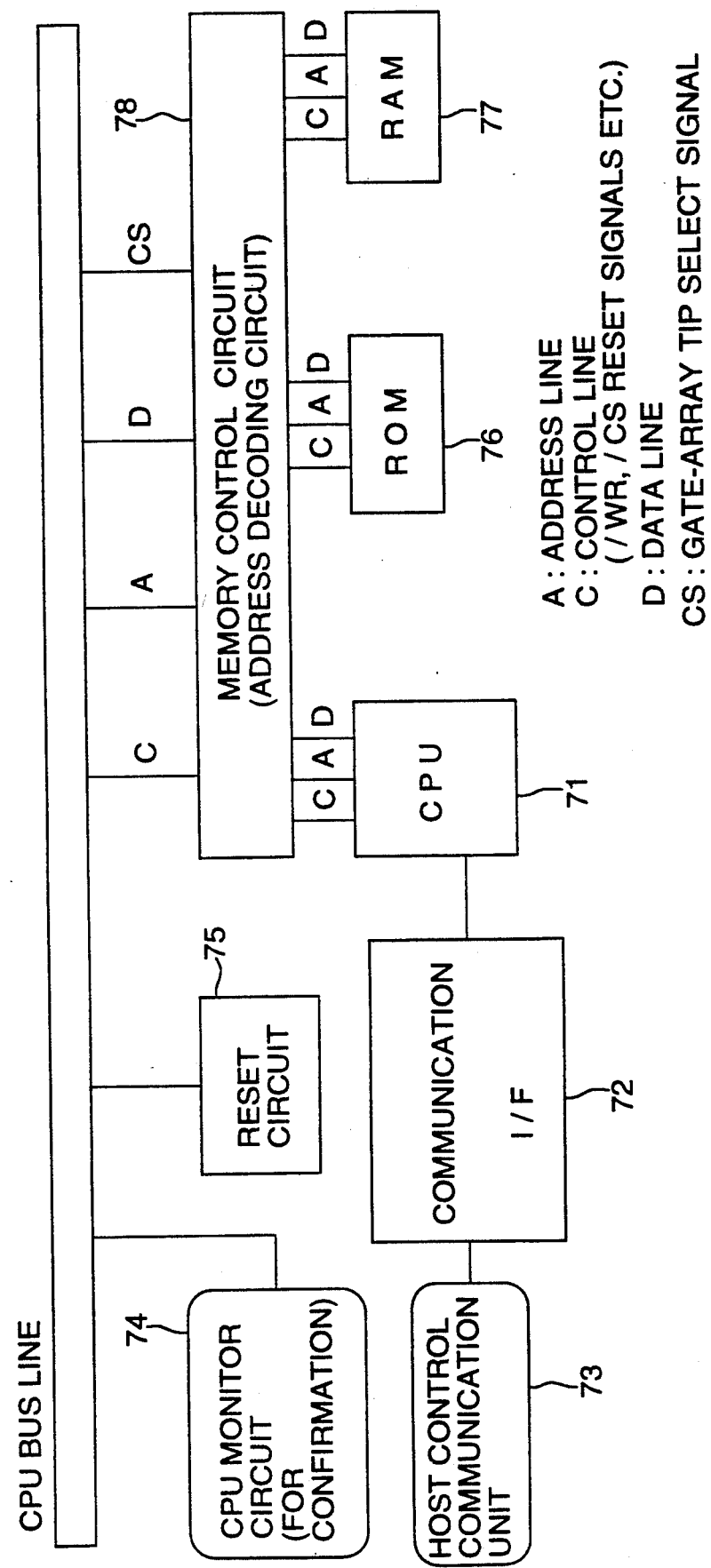
FIG. 7 is a block diagram of circuits showing the microcomputer section in the image processing circuits of an example.

In FIG. 6, the numeral 63 is a RAM for arithmetic use. FIG. 7 is a diagram showing a microcomputer section composed of CPU 71 that controls the above-mentioned processing circuits and its peripheral circuits, and processing circuits shown in FIGS. 1-6 and CPU 71 both mentioned above are connected through CPU bus line.

The CPU 71 conducts designation of an image processing mode based on discrimination data of a document to be processed, which will be stated later, and reports on results of image analysis to communication unit 73 in the printer main body through communication interface 72.

FIG. 7 shows CPU monitor circuit 74, reset circuit 75, ROM 76, RAM 77 and address decode circuit 78 in addition to the above-mentioned constitution.

Next, concrete contents of processing for copying will be explained as follows.

Figure 8C:
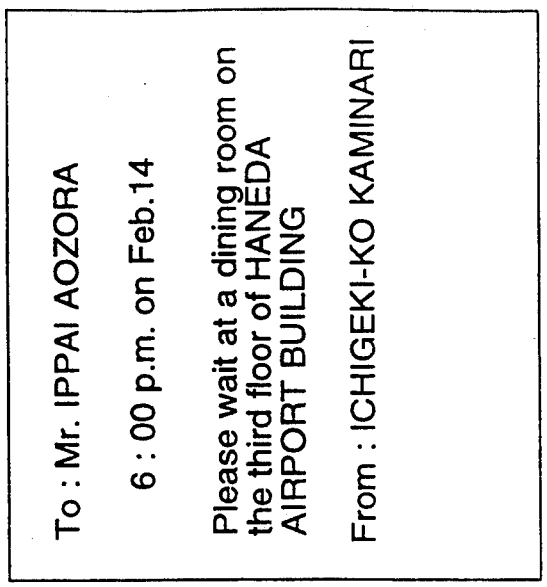
FIGS. 8(A) through 8(C) are diagrams showing examples of a color document, a marker document and a black and white document.
Figure 8B:
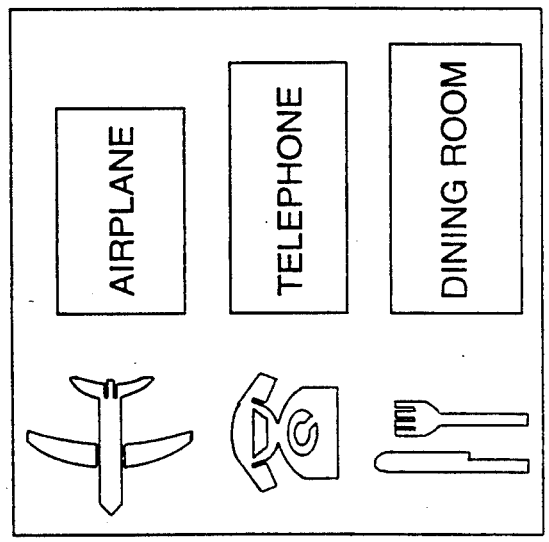
Figure 8A:
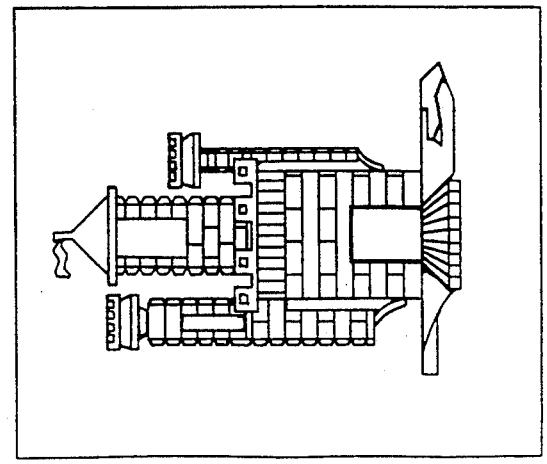

Let it be assumed that documents in three kinds as shown in FIGS. 8 (A)-(C) are set mixedly on an ADF of a digital copying machine in the present example, first.

The document (A) mentioned above is a color document and a document for printing of illustrations and photographs. The document (B) is a marker document on which a region is designated with a marker pen so that characters in the region may be encircled while document information such as symbols and characters are totally recorded in black and white. Further, document (C) is a black and white document having thereon only character information.

It is necessary to conduct image processing and copying operation, through a color copy mode wherein a plurality of toner images are formed for the color document (A), through a black and white copying mode for forming only black toner images for black and white document (C), and through a marker color conversion mode wherein a marker region is converted to a color of a marker pen for recording process for marker document (B). In an arrangement of the present example, CPU 71 discriminates, in the manner mentioned later, a document fed automatically to single out the kind of the document out of the three kinds, and a relevant copy mode is selected for execution based on the results of the discrimination.

Figure 9:
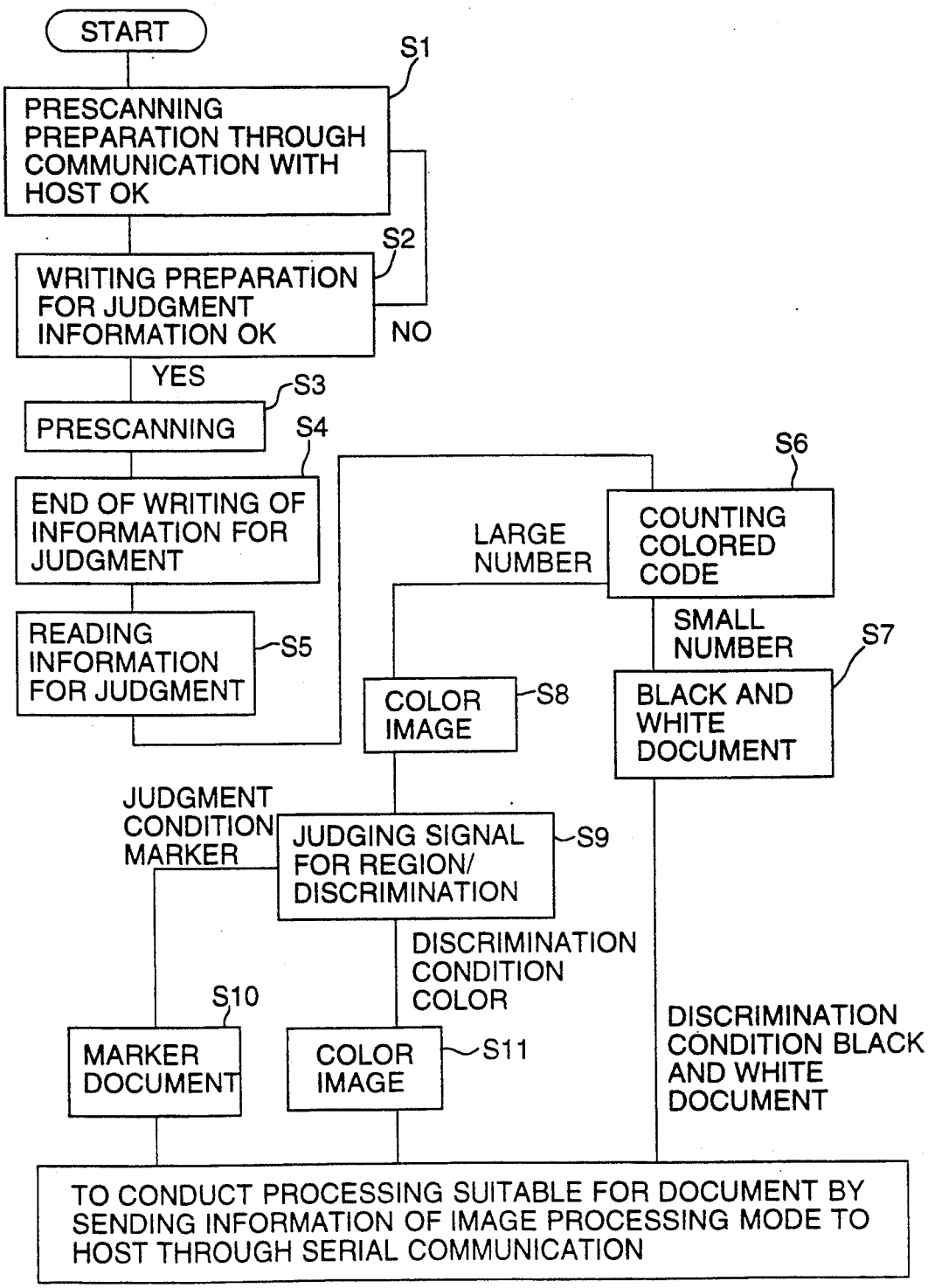
FIG. 9 is a flow chart showing how the document is discriminated.

The document discrimination mentioned above will be explained in detail as follows, referring to the flow chart in FIG. 9. Incidentally, in the present example, a function as a document discrimination means is realized when CPU 71 conducts image analysis according to a program set on ROM 76 as shown on the flow chart in FIG. 9.

First, through communication with a host, completion of preparation for pre scanning is discriminated (S1), then completion of preparation for writing of information for judgment use is discriminated (S2), and pre scanning of a document fed automatically from ADF is executed (S3).

Through the pre-scanning, the aforementioned color code signal CC, marker region signal and image discrimination signal PM are outputted by the circuit constitution explained above, and these data are stored in a memory as data for document discrimination use collected through pre-scanning (S4).

Figure 10:
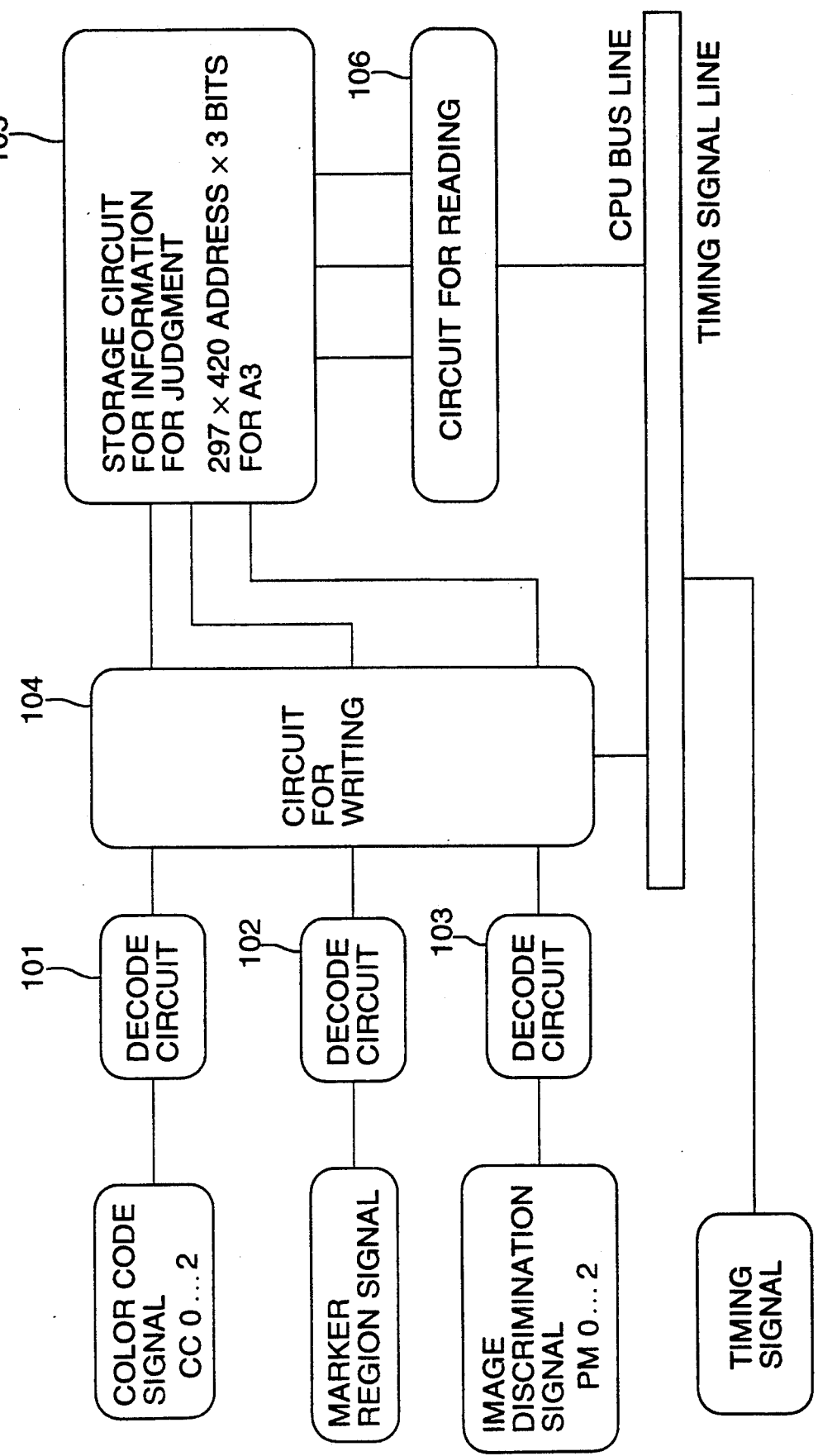
FIG. 10 is a block diagram of circuits showing the information collection circuits for document discrimination.

Writing the aforementioned document discrimination data (color code signal CC: marker region signal and image discrimination signal PM) into a memory and reading them out of the memory are realized through the circuit shown in FIG. 10.

Namely, the above-mentioned color code signal CC collected through pre-scanning, marker region signals and image discrimination signals PM are decoded respectively by decode circuits 101, 102 and 103 and then stored successively in judgment information storage circuit 105 through writing circuit 104. When discriminating the kinds of documents to be read based on information stored in the judgment information storage circuit 105 mentioned above, the stored information is read through reading circuit 106.

The color code signal CC mentioned above is converted, by means of decode circuit 101, to 1-bit data D0 (colored code) which shows whether a pixel of the color code signal is colored or not, a marker region signal is converted, by means of decode circuit 102, to 1-bit data A1 which shows whether it is in a marker region or not, and image discrimination signal PM is converted, by means of decode circuit 103, to 1-bit data D2 which shows whether it represents a photographic image or a character/line image, resulting in that judgment information composed of 3 bits is stored for each pixel.

Incidentally, when a document is read with reading density of 16 dots/mm in the course of pre scanning, for example, 3-bit information is stored in each of 297×420 addresses for A3 size document.

After information for judgment use having the constitution mentioned above is read from the judgment information storage circuit 105, the read document is discriminated, based on the data D0, whether it corresponds to a color document group consisting of a color document having a colored portion or a marker image or to a black and white document having no colored portion (S6).

Namely, in the case where the data D0 takes 1 when a pixel is judged to be a colored pixel after the discrimination of color code signal CC of each pixel and the data D0 takes 0 when a pixel is judged to be a non colored pixel, for example, it is possible, by counting the data D0 representing 0 or D0 representing 1, to judge whether the read document corresponds to a color document group consisting of a color document having a colored portion or a marker image or to a black and white document having no colored portion.

In this case, when the number of colored pixels is small and the document is discriminated to be a black and white document (S7), the judgment processing is ended at that moment, and a printer is instructed to copy on a black and white mode, while image processing for a black and white document (output processing of monotone density signal) is conducted in the course of regular scanning and image signals corresponding to document images are outputted to the printer section.

On the other hand, when the document is judged to be a document included in a color document group (S8), the document is either a color document or a marker document, and it is necessary to discriminate which the document belongs.

Judgment for discriminating which the document belongs, the aforementioned color document or a marker document, is conducted based on marker region signals and image discriminating signals mentioned above (S9).

Namely, when it is judged that no marker region exists, it means an occasion wherein colored portions exist and marker regions are not designated. Therefore, the document is discriminated to be a color document (S11).

When a marker region exists, on the other hand, a document can not be discriminated by existence of the marker region alone because the marker region is sometimes detected erroneously based on document description to be read on a color document.

Therefore, results of image discrimination in the marker region are used. For example, when an image in the marker region is a character/line image, the document is discriminated to be a marker document (S10), while when an image in the marker region is a photographic image having gradation, the document is discriminated not to be a marker document but to be a color document (S11).

After the color document and marker document are discriminated in the manner mentioned above, the results of document discrimination are sent to a printer section through serial communication, either an ordinary color copy mode or a partial color conversion mode is selected as an image processing mode. Thus, an image processing is carried out in the course of regular scanning according to the selected mode.

To be concrete, in the case of a color document, image data composed of color code signals and density data ND for each pixel are outputted successively after being selected to match a color of copying, while in the case of a marker document, an image within a marker region is converted for the output thereof to the color used for region designation.

Therefore, in a copying machine of a digital type in the present example, even when a color document, a black and white document and a marker document are subjected to automatic conveyance mixedly, the type of the read document among the three document types mentioned above can be discriminated based on information (color discrimination, region information and image discrimination) collected through pre-scanning. Under the mode corresponding to the results of the discrimination, image processing is carried out to start copying operations. Accordingly, it is possible to process continuously under the condition that the aforementioned three types of documents are caused to exist mixedly, resulting in high productivity of copying.

Incidentally, though an example in the present embodiment represents a digital type copying machine wherein the type of the read document is discriminated from the inputted color image information, and image information processed according to the results of the discrimination is outputted to a printer section, the constitution wherein the results of image processing (video signal VD) are outputted to a CRT device or the like for display may also be acceptable.

As explained above, in the image processing apparatus of the invention, based on inputted color image information, a type of a document corresponding to the color image information mentioned above can be discriminated automatically whether it falls on a color document, a black and white document or a marker document, and output processing according to the discriminated type of the document can be carried out. Therefore, when the invention is applied to a digital type copying machine, for example, even when the aforesaid types of documents are set mixedly on an ADF, the copying machine can operate on a mode which is suitable for each document, resulting in an effect that the productivity of copying is improved.

What is claimed is:

1. An apparatus for processing an image on an original document, the apparatus comprising:

means for reading the image and for generating color image signals;

document discrimination means for identifying a document type for the original document from the color image signals generated, the document type being identified as one of a color document, a black and white document, or a marked document, wherein the marked document has an image processing region designated with a marked color differing in color from existing colors of the image on the original document, and further wherein the document discrimination means includes color discrimination means for conducting color discrimination for each pixel of the color image signals generated, region detection means for detecting a designated image processing region based on the color discrimination results, and image discrimination means for identifying an image type for the image on the original document as being one of either a photographic image having a gradation or a letter and line image, based on the color image signals generated, the document type for the original document being identified based on the results obtained by the color discrimination means, the region detection means, and the image discrimination means, wherein the document discrimination means first identifies whether the document type for the original document is in either a color document group, which includes the document types of the color document and the marked document, or a montone document group, which includes the document type of the black and white document, based on the result obtained by the color discrimination means, and when the document type for the original document is identified as being in the color document group, the region detection means detects whether the original document has a designated image processing region and the image discrimination means identifies the image type for the image within the designated image processing region, so that the document discrimination means identifies the document type for the original document as the marked document when the image discrimination means identifies the image type for the image within the designated image processing region as the letter and line image; and processing means for processing the color image signals, the processing means having a plurality of processing modes, one of the plurality of processing modes being selected to process the color image signals in accordance with the document type identified for the original document.

2. The apparatus of claim 1, wherein, when the document type for the original document is identified as being the marked document, the document discrimination means outputs data corresponding to the marked color and data corresponding to the marked image processing region, and the processing means selects the processing mode to change the existing color of the image within the marked image processing region into the marked color.

* * * * *

UNITED STATES PATENT AND TRADEMARK OFFICE
CERTIFICATE OF CORRECTION

PATENT NO. : 5,321,531
DATED : June 14, 1994
INVENTOR(S) : Takashi Hasebe et al.

It is certified that error appears in the above-indentified patent and that said Letters Patent is hereby corrected as shown below:

Abstract, line 2, after "signals", insert --as--.

Signed and Sealed this

Twenty-ninth Day of November, 1994

Attest:

BRUCE LEHMAN

Attesting Officer       Commissioner of Patents and Trademarks